United States Patent
Campbell

(10) Patent No.: US 8,582,810 B2
(45) Date of Patent: Nov. 12, 2013

(54) DETECTING POTENTIAL CHANGED OBJECTS IN IMAGES

(75) Inventor: Edward Slinger Campbell, Bristol (GB)

(73) Assignee: BAE Systems PLC, London (GB)

(*) Notice: Subject to any disclaimer, the term of this patent is extended or adjusted under 35 U.S.C. 154(b) by 200 days.

(21) Appl. No.: 13/146,549

(22) PCT Filed: Jan. 28, 2010

(86) PCT No.: PCT/GB2010/050127
§ 371 (c)(1),
(2), (4) Date: Jul. 27, 2011

(87) PCT Pub. No.: WO2010/086655
PCT Pub. Date: Aug. 5, 2010

(65) Prior Publication Data
US 2011/0286674 A1    Nov. 24, 2011

(30) Foreign Application Priority Data

Jan. 28, 2009  (EP) .................................. 09275006
Jan. 28, 2009  (GB) .................................. 0901369.9

(51) Int. Cl.
*G06K 9/00* (2006.01)

(52) U.S. Cl.
USPC ........... 382/103; 345/427; 348/142; 348/143; 348/239; 348/87; 702/150

(58) Field of Classification Search
None
See application file for complete search history.

(56) References Cited

U.S. PATENT DOCUMENTS

| | | | | |
|---|---|---|---|---|
| 5,640,200 A * | 6/1997 | Michael | ........................... | 348/87 |
| 5,706,416 A * | 1/1998 | Mann et al. | ................... | 345/427 |
| 6,163,620 A | 12/2000 | Hojnacki et al. | | |
| 6,192,322 B1 * | 2/2001 | Rafanelli et al. | .............. | 702/150 |
| 2001/0040924 A1 * | 11/2001 | Hori et al. | ................. | 375/240.16 |
| 2003/0053658 A1 * | 3/2003 | Pavlidis | ........................ | 382/103 |
| 2003/0123703 A1 * | 7/2003 | Pavlidis et al. | ............... | 382/103 |

(Continued)

FOREIGN PATENT DOCUMENTS

DE    101 04 732 C1   6/2002
DE    10 2005 048 314 A1   4/2007

(Continued)

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued in the corresponding International Application No. PCT/GB2010/050127 dated Aug. 11, 2011.

(Continued)

*Primary Examiner* — Tsung-Yin Tsai
(74) *Attorney, Agent, or Firm* — Buchanan Ingersoll & Rooney PC

(57) ABSTRACT

A method of detecting potential changed objects in a first image and a second image, where the first and second images at least partially overlap. The method includes obtaining data describing first and second images and detecting sets of objects in images. A common coordinate system for the sets of objects is calculated. Objects in the sets are eliminated based on positions of the objects and objects outside an area of overlap of the images are eliminated. Data indicating the zero or more remaining objects in the sets is output to indicate potential changed objects.

20 Claims, 3 Drawing Sheets

(56) References Cited

U.S. PATENT DOCUMENTS

| | | | |
|---|---|---|---|
| 2005/0007450 A1* | 1/2005 | Hill et al. | 348/142 |
| 2005/0196017 A1* | 9/2005 | Altherr et al. | 382/103 |
| 2005/0270385 A1* | 12/2005 | Shioya et al. | 348/239 |
| 2009/0128839 A1* | 5/2009 | Mori | 358/1.9 |
| 2012/0154579 A1* | 6/2012 | Hampapur et al. | 348/143 |

FOREIGN PATENT DOCUMENTS

| | | |
|---|---|---|
| EP | 0 961 226 A2 | 12/1999 |
| JP | 4-67276 A | 3/1992 |
| JP | 2003-256842 A | 9/2003 |
| WO | WO 2009/019695 A2 | 2/2009 |

OTHER PUBLICATIONS

White R.G., "Change detection in SAR imagery", IEE Colloquium on Synthetic Aperture radar, Nov. 29, 1989, 3 pages.

White R.G. et al., "Change detection in SAR imagery", International Radar Conference, May 7, 1990, 6 pages.

Himayat N. et al., "A Structure for Adaptive Order Statistics Filtering" IEEE Transactions on Image Processing, vol. 3, No. 3, May 1, 1994, pp. 265-280.

International Search Report (PCT/ISA/210) issued on Apr. 16, 2010, by British Patent Office as the International Searching Authority for International Application No. PCT/GB2010/050127.

European Search Report issued on Jul. 3, 2009.

British Search Report issued May 8, 2009.

Ratan A. L. et al., "Object Detection and Localization by Dynamic Template Warping", International Journal of Computer Vision, (2000), vol. 36, Issue 2, pp. 131-147.

Bancroft J.C., "Introduction to Matched Filters", Crewes Research Report, (2002), vol. 14, pp. 1-8.

Gonzalez-Nuevo J. et al., "The Mexican Hat Wavelet Family", Monthly Notices of the Royal Astronomical Society, (2006), vol. 369, pp. 1603-1610.

Savage R.S. et al., "Bayesian Methods of Astronomical Source Extraction", The Astrophysical Journal, (2007), vol. 661, Issue 2, pp. 1339-1346.

Zitova B. et al., "Image Registration Methods: a survey", Image and Vision Computing, (Oct. 2003), vol. 21, Issue 11, pp. 977-1000.

\* cited by examiner

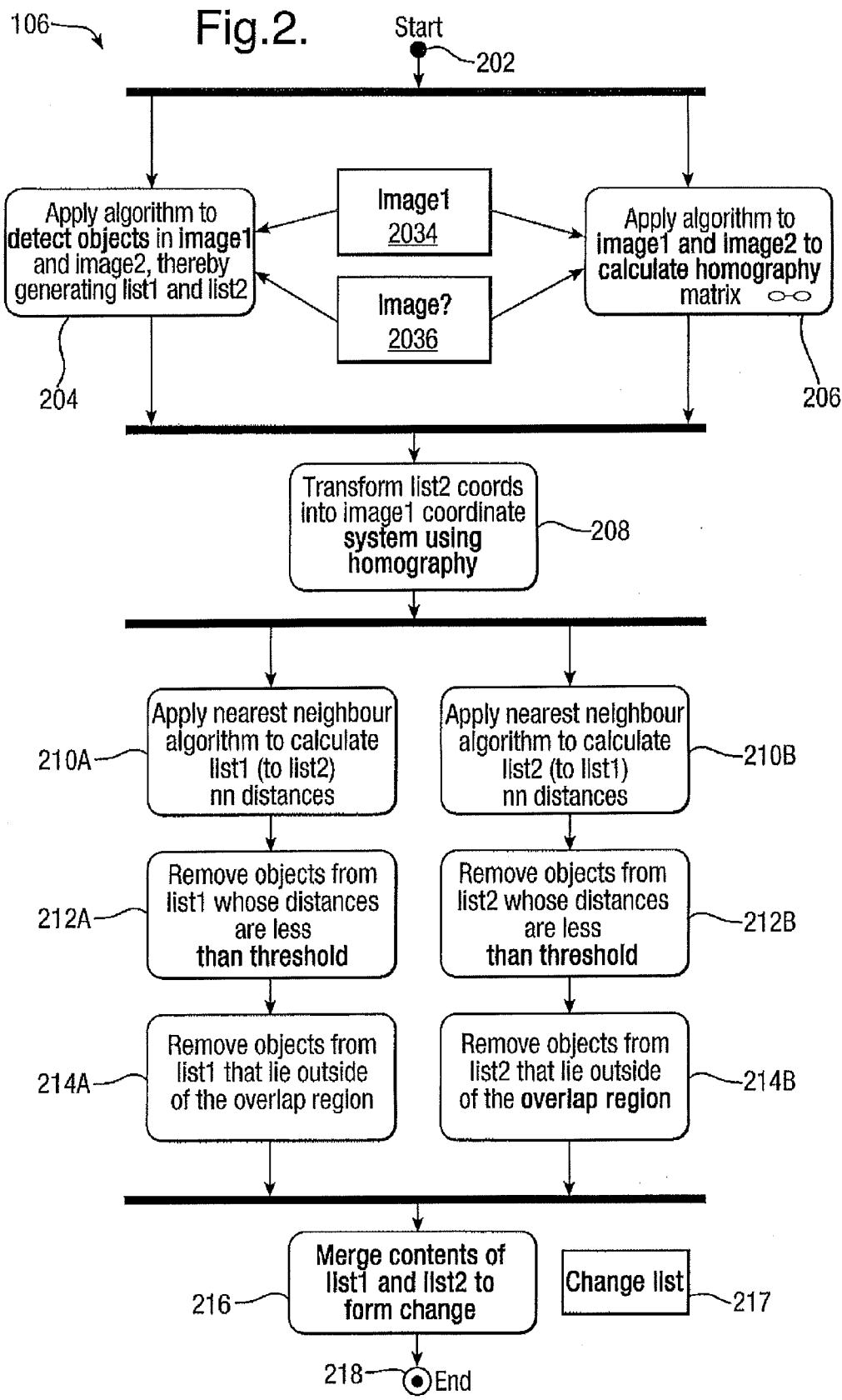

DETECTING POTENTIAL CHANGED OBJECTS IN IMAGES

BACKGROUND TO THE INVENTION

The present invention relates to detecting potential changed objects in images.

Various techniques for detecting changed objects in pairs of images are known. Such techniques have associated advantages and disadvantages when compared to each other and their performance can vary depending on the nature (e.g. light conditions) of the images being processed.

OBJECTS OF THE INVENTION

Embodiments of the present invention are intended to detect potential changed objects in images with an improved accuracy in at least some cases in comparison with known techniques. Some embodiments can also be implemented using modular programming techniques.

SUMMARY OF THE INVENTION

According to one aspect of the present invention there is provided a method of detecting potential changed objects in a first image and a second image, where the first and second images at least partially overlap, the method including:

obtaining data describing a first image and data describing a second image;

detecting a first set of objects in the first image data;

detecting a second set of objects in the second image data;

calculating a common coordinate system for the first set of objects and the second set of objects;

converting locations of the objects in the first set and/or the second set into the common coordinate system;

eliminating zero or more said objects in the first set and the second set based on positions of the objects in the sets;

eliminating zero or more said objects in the first set and the second set that are located outside an area of overlap of the first image and the second image, and outputting data indicating zero or more remaining said objects in the first set and the second set as potential changed objects.

The data output may include all the objects not eliminated from the first set and all the objects not eliminated from the second set.

The step of eliminating zero or more said objects in the first set and the second set based on positions of the objects in the sets may include:

calculating a distance from at least one object in the first set and a nearest neighbour of that object in the second set;

calculating a distance from at least one object in the second set and a nearest neighbour of that object in the first set;

eliminating a said object in the first set if the distance between that object and the nearest neighbour of the object meets one or more culling criteria, and eliminating a said object in the second set if the distance between that object and the nearest neighbour of the object meets the culling criteria.

The distance between the objects may meet the culling criteria if it is below a threshold value. The threshold value may correspond to a registration error value of a registration process used to calculate the common coordinate system. The threshold value may correspond to 10 pixels of the first and second image data.

The detecting of the first set of objects in the first image data and/or the detecting of the second set of objects in the second image data may be performed using a Triple Window Filter-based object detection algorithm.

The calculating of the common coordinate system may include generating a homography matrix.

The method may include allowing a user to select an object detection technique from a set of object detection techniques for detecting the first set and/or the second set of objects. The method may include allowing a user to select a common coordinate system from a set of registration techniques for the calculation of the common coordinate system.

According to another aspect of the present invention there is provided apparatus configured to detect potential changed objects in a first image and a second image, where the first and second images at least partially overlap, the apparatus including:

a device configured to obtain data describing a first image and data describing a second image;

a device configured to detect a first set of objects in the first image data;

a device configured to detect a second set of objects in the second image data;

a device configured to calculate a common coordinate system for the first set of objects and the second set of objects;

a device configured to convert locations of the objects in the first set and/or the second set into the common coordinate system;

a device configured to eliminate zero or more said objects in the first set and the second set based on positions of the objects in the sets;

a device configured to eliminate zero or more said objects in the first set and the second set that are located outside an area of overlap of the first image and the second image, and a device configured to output data indicating zero or more remaining said objects in the first set and the second set as potential changed objects.

According to yet another aspect of the present invention there is provided a computer program product comprising a computer readable medium, having thereon:

computer program code means, when the program code is loaded, to make the computer execute a method of detecting potential changed objects in a first image and a second image, where the first and second images at least partially overlap substantially as described herein.

According to one aspect of the present invention there is provided a method of detecting potential changed objects in a first image and a second image, the method including:

obtaining data describing a first image and data describing a second image;

detecting a first set of objects in the first image data and a second set of objects in the second image data using a Triple Window Filter-based object detection technique;

calculating a common coordinate system for the first set of objects and the second set of objects using a homography matrix;

converting locations of the second set of objects into the common coordinate system;

removing zero or more said object from the first and the second set that does not correspond to a potentially changed object, and outputting data indicating zero or more said object in the first set and the second set as potential changed objects.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

BIREF DESCRIPTION OF THE DRAWINGS

The invention may be performed in various ways, and, by way of example only, embodiments thereof will now be described, reference being made to the accompanying drawings in which:

FIG. 2 is a flowchart that illustrates steps performed by the image processing application.

DESCRIPTION OF THE PREFERRED EMBODIMENT

Figure 1:
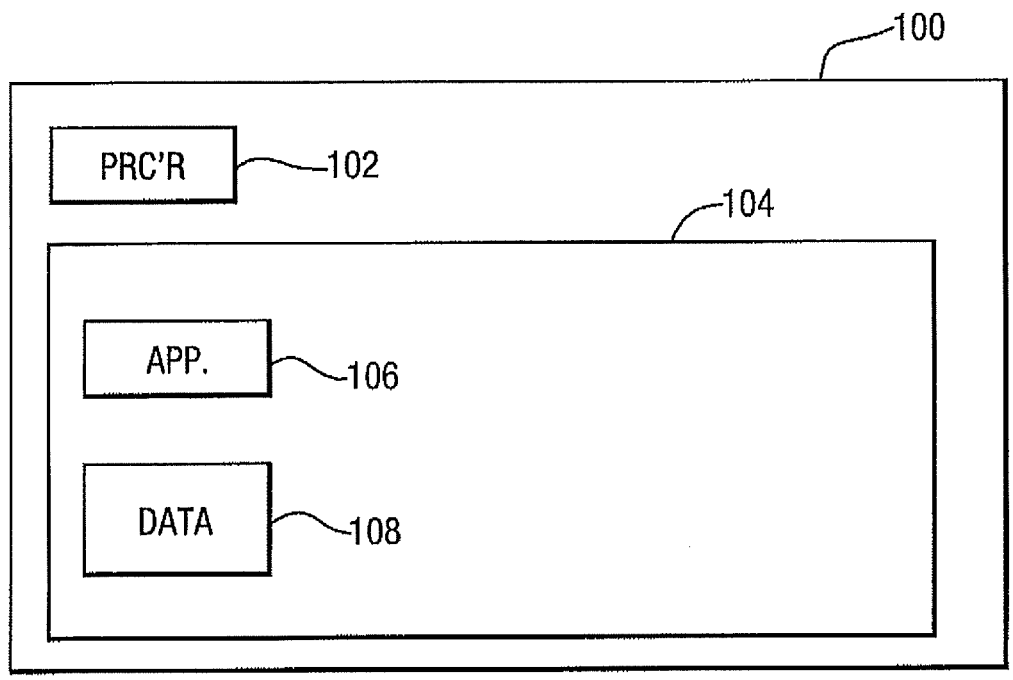
FIG. 1 is a schematic drawing showing a computing device configured to execute an image processing application.

FIG. 1 shows schematically a computing device 100 that includes a processor 102 and an internal memory 104. It will be understood that the computer can include other conventional features, such as a display, user input devices (e.g. a mouse/keyboard), an external memory and network connections. The memory 104 stores code including an application 106 that can be used to process image data 108. Again, it will be understood that the set up shown is exemplary and the image data may be stored in another location, e.g. a remote computer accessed over a network.

FIG. 2 shows steps performed by the image processing application 106. It will be understood that the steps shown are exemplary only and can be performed in a different order and/or some of the steps may be omitted. The process starts at step 202 with the receipt of data describing first 203A and second 203B images. It will be understood that the image data can be of any format and will normally, but not necessarily, be stored in two separate files. The two images will normally be associated, e.g. show the same location at different times and/or perspectives, and can include at least one object. Typical applications include images where the objects comprise targets that are to be monitored for security reasons or the like. An object can comprise any body, e.g. a vehicle, that is capable of visually-discernable change, e.g. change in location or another state, such as size, damage, bearing, etc.

At step 204 an object detection algorithm is applied to the first and second image data. In some embodiments, the application 106 is written using modular programming techniques so that pre-existing software modules can be used to perform at least some of its steps. For instance, the object detection step may call a suitable software module (e.g. from a library), which allows alternative detection techniques to be easily used, e.g. some object detection algorithms may be more efficient or effective for particular types of objects or images. Any suitable algorithm, e.g. a Triple Window Filter-based algorithm can be used. A technique of this type is described in Himayat N., "A Structure for Adaptive Order Statistics Filtering", IEEE TRANSACTIONS ON IMAGE PROCESSING, VOL. 3. NO. 3, MAY 1994, pp 265-280. Many other object detection techniques could be used. In astronomy this technique is often referred to as "source extraction" because point-like radio sources (that appear as typically Gaussian Point spread functions in resulting images) need to be detected. An example of this type of algorithm is described in Richard S. Savage et a, "Bayesian Methods of Astronomical Source Extraction", 2007 *ApJ* 661 1339-1346. Other approaches that can be used include the Matched Filter (see John Bancroft, "Introduction to Matched Filters", *CREWES Research Report.* Volume 14 (2002) pp 1-8); Template matching (see Aparna Lakshmi Ratan et al, "Object Detection and Localization by Dynamic Template Warping", International Journal of Computer Vision, Volume 36, Issue 2 (February 2000) pp 131-147); the Mexican hat wavelet filter (see J. Gonzalez-Nuevo et al, "The Mexican Hat Wavelet Family. Application to point source detection in CMB maps", Mon. Not. Roy. Astron. Soc. 369: 1603-1610, 2006; see also http://arxiv.org/abs/astro-ph/0606199).

The object detection algorithm outputs data ("list1") representing at least one object detected in the first image 203A and data ("list2") representing at least one object detected in the second image 203B.

At step 206, an object registration algorithm is applied to the first and second image data in order to provide a common coordinate system that can be used to express the locations of objects in the two images. Again, a suitable known object registration algorithm may be used, such as the ones discussed in Zitova and Flusser, "Image registration methods: a survey", Image and Vision Computing 21 (2003) 977-1000. The two basic classes of techniques are feature-based and area-based. This second class typically involves calculating the correlation between the two images and finding the translation (or general transformation) that maximises the correlation. In the preferred embodiment, a feature-based registration technique that involves calculating a homography matrix that encodes the coordinate transformation based on data contained in the two input images and their headers is used. Homography-based registration techniques allow two images captured from different locations (and therefore with different fields of view and perspective) to be aligned so that their contents can be compared by subsequent processing. The homography matrix can then be used, at step 208, to convert the locations of objects in the list1 and list2 data. The common coordinate system calculation step may also call a suitable pre-existing software module. The application may give the user an opportunity of selecting which algorithms/modules are to be used and may allow provide a facility to configure the selected algorithm(s).

In some embodiments of the present method, the registration algorithm used comprises the homography transformation described in the co-pending patent applications filed in the name of the proprietor of the present case on $28^{th}$ October 2008 as British patent application no. 0819730.3 and European patent application no. 08275065.4 (the contents of which are hereby incorporated by reference). Briefly, those patent applications describe a registration algorithm involves selecting a homography model from point correspondences of an associated image pair; a method of filtering point correspondences from a pair of associated images; a method of calculating a homography transformation; and a method of image differencing; comprising implementing one or more sampling constraints, e.g. partition zones and an exclusion zone, that provide a more even spread of point selection over the image, and/or that provide for selected points to be spread further apart, than would be the case if the one or more sampling constraints were not implemented. Repeated selections of combinations of points may be selected in a deterministic manner, and the deterministic manner may be tailored to an escape condition. In one of the embodiments, the method of calculating a homography transformation comprises: implementing one or more sampling constraints that provide a more even spread of point selection over the image, and/or that provide for selected points to be spread further apart, than would be the case if the one or more sampling constraints were not implemented; performing sample consensus constrained by the sampling constraint or constraints to select the homography model; filtering the point correspondences using the selected model; and performing a least squares method on the point correspondences that remain after the filtering step.

Some of the detected objects in list1 and list2 will correspond to the same physical object. The subsequent steps of the process of FIG. 2 are primarily concerned with eliminating any of the objects found in the images that don't correspond to changes in objects present in the two images.

Figure 3A:
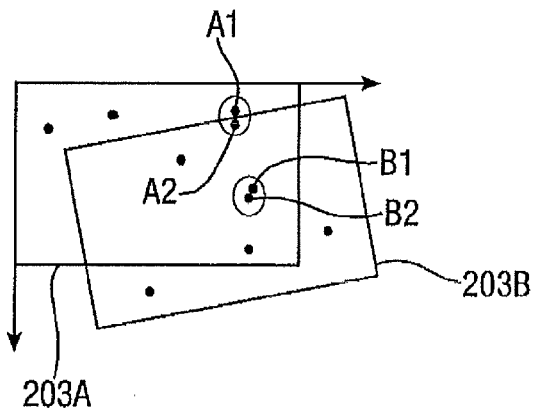
FIGS. 3A-3C illustrate schematically operations performed by the application.

At step 210A a nearest neighbour algorithm is applied to calculate the distance from each object in list1 to its nearest neighbour in list2. Any suitable known nearest neighbour algorithm, e.g. brute force, may be used. The distances calculated are stored and at step 212A objects in list1 having distances that fall below a threshold are removed from list1. This removal of objects is based on the assumption that if two objects are detected in approximately the same location in the two images then neither corresponds to a change. In the example, this is done by calculating the distance between an object and its nearest neighbour, but alternatives are possible. As illustrated in FIG. 3A, object A1 in the first image 203A and object A2 in the second image 203B are separated from each other by short distances and so are probably the same object. The same also applies to object B1 in the first image and object B2 detected in the second image in the example. These objects are circled in the Figure for illustrative purposes.

The threshold distance may be set to correspond to the registration error, that is, the maximum change in position that can be introduced between the detected locations due to errors in the registration process. In a practical implementation of the method, a value of 10 pixels was identified as a suitable value for the nearest neighbour threshold. The threshold is used in determining whether detections in two overlapping images correspond to the same physical object. The optimum value for this parameter may be data dependent and so the application may be modified to calculate the nearest neighbour threshold at runtime, based on the input image data. This threshold could be either global, but derived from a summary statistic such as the mean symmetric transfer error. Alternatively, the threshold can be local, that is, the threshold may vary with position within the image to allow for areas where the homography-based registration is more or less accurate. By optimising this parameter, the performance of algorithm may be improved both in terms of TPR (True Positive Rate) and FDR (False Discovery Rate), but also in terms of the minimum movement of an object that the application is capable of detecting as a change.

Figure 3B:
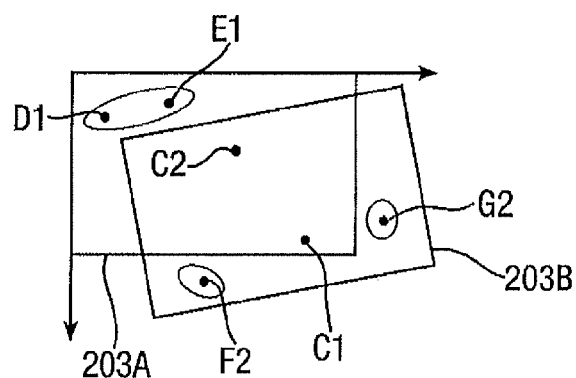

The remaining objects in list1 at this point represent detected objects that have no corresponding object in list2 (or have moved sufficiently far so as to be considered different objects). However, not all of the remaining objects are necessarily changes. Given the first 203A and second 203B images are not necessarily constrained to overlap completely, it is possible for objects in list1 to lie outside the area contained in the second image (and vice versa). For instance, in FIG. 3B, the only two objects that are located in the overlap between the first and second images are C1 (in the first image 203A) and C2 (in the second image 203B). The objects D1 and E1 are included in the first image only and the objects F2 and G2 are included in the second image only. Such objects are circled in the Figure for illustrative purposes. It is not possible in such cases to determine whether these objects constitute changes between the two images and so any objects that lie outside the overlap between the first and second images are discarded from list1 at step 214A. In the example, list1 will now only comprise object C1 only.

Figure 3C:
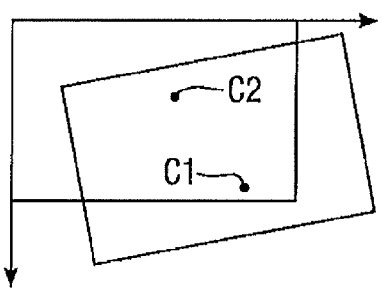

As shown in FIG. 2, steps 210B-214B are also executed. These operations correspond to steps 210A-214A, respectively, but involve calculating the nearest neighbour distance between all objects from list2 to list1 (rather than from list1 to list2, as in step 210A), removing objects having nearest neighbour distances falling below the distance threshold from list2 and removing objects from list2 that lie outside the region of overlap between the first and second images. In the example of FIGS. 3, list2 will contain object C2 only after execution of the steps. It will be understood that the steps 210A-214A and 210B-214B may be coded to execute in a sequential or parallel manner (e.g. using conventional parallel programming techniques). Further, more than a single pair of associated images may be compared.

It may be considered more efficient to cull objects outside of the region of overlap prior to carrying out the nearest neighbour cull, thereby reducing the demands on the nearest neighbour algorithm. However, this could have the potential to introduce edge effects, whereby an object is culled just outside the overlap region that would have matched an object inside. This could be avoided by extending the overlap region by the size of the distance threshold (i.e. registration error), but the added complexity in implementation that would result may not be justified in view of small optimisation this might provide.

The remaining objects in list1 and list2 are merged at step 216 to form a single list 217 of changes that form the output of the application before it ends at step 218. The data can comprise a list of objects in the first image that have changed and a list of objects in the second image that have changed (either list may contain zero objects if no changes were detected). In alternative embodiments, further processing may be carried out to attempt to identify links or correspondences between the objects in the lists, e.g. specify that object C2 in the second image is potentially a changed version of object C1 in the first image, and so on. Data describing the merged list can be displayed to a user, stored for further processing, etc, depending on the overall nature of the image processing application 106.

The invention claimed is:

1. A method of detecting potential changed objects in a first image and a second image, where the first and second images at least partially overlap, the method including:
   obtaining data describing a first image and data describing a second image;
   detecting a first set of objects in the first image data;
   detecting a second set of objects in the second image data;
   calculating a common coordinate system for the first set of objects and the second set of objects;
   converting locations of the objects in the first set and/or the second set into the common coordinate system;
   targeting of said objects in the first set and the second set based on positions of the objects in the sets;
   targeting of said objects in the first set and the second set that are located outside an area of overlap of the first image and the second image; and
   outputting data indicating zero or more of said objects in the first set and the second set as potential changed objects,
   wherein the step of eliminating zero or more objects in the first set and the second set based on positions of the objects in the sets includes:

calculating a distance from at least one object in the first set and a nearest neighbour of that object in the second set;

calculating a distance from at least one object in the second set and a nearest neighbour of that object in the first set;

eliminating a said object in the first set if the distance between that object and the nearest neighbour of the object meets one or more culling criteria; and eliminating a said object in the second set if the distance between that object and the nearest neighbour of the object meets the culling criteria.

2. A method according to claim 1, wherein the data output includes all the objects not eliminated from the first set and all the objects not eliminated from the second set.

3. A method according to claim 1, wherein the distance between the objects meets the culling criteria if it is below a threshold value.

4. A method according to claim 3, wherein the threshold value corresponds to a registration error value of a registration process used to calculate the common coordinate system.

5. A method according to claim 4, wherein the threshold value corresponds to 10 pixels in the first and second image data.

6. A method according to claim 1, wherein the detecting of the first set of objects in the first image data and/or the detecting of the second set of objects in the second image data is performed using a Triple Window Filter-based object detection algorithm.

7. A method according to claim 1, wherein the calculating of the common coordinate system includes generating a homography matrix.

8. A method according to claim 1, including allowing a user to select an object detection technique from a set of object detection techniques for detecting the first set and/or the second set of objects.

9. A method according to claim 1, including allowing a user to select from a set of registration techniques to determine the calculation of the common coordinate system.

10. A method according to claim 1, comprising:
executing the step of eliminating zero or more said objects in the first set and the second set based on positions of the objects in the sets in a sequential manner.

11. A method according to claim 1, comprising:
executing the step of eliminating zero or more said objects in the first set and the second set based on positions of the objects in the sets in a parallel manner.

12. A system configured to detect potential changed objects in a first image and a second image, where the first and second images at least partially overlap, the apparatus including:
a first device configured to obtain data describing a first image and data describing a second image;
a second device configured to detect a first set of objects in the first image data;
a third device configured to detect a second set of objects in the second image data;
a fourth device configured to calculate a common coordinate system for the first set of objects and the second set of objects;
a fifth device configured to convert locations of the objects in the first set and/or the second set into the common coordinate system;
a sixth device configured to target of said objects in the first set and the second set based on positions of the objects in the sets;
a seventh device configured to target of said objects in the first set and the second set that are located outside an area of overlap of the first image and the second image; and
an eighth device configured to output data indicating zero or more of said objects in the first set and the second set as potential changed objects,
wherein at least one of the sixth, seventh, and/or eighth devices is configured to eliminate zero or more objects in the first set and the second set based on positions of the objects in the sets and is arranged:
to calculate a distance from at least one object in the first set and a nearest neighbour of that object in the second set;
to calculate a distance from at least one object in the second set and a nearest neighbour of that object in the first set;
to eliminate a said object in the first set if the distance between that object and the nearest neighbour of the object meets one or more culling criteria; and
to eliminate a said object in the second set if the distance between that object and the nearest neighbour of the object meets the culling criteria.

13. An apparatus according to claim 12, wherein the data output includes all the objects not eliminated from the first set and all the objects not eliminated from the second set.

14. An apparatus according to claim 12, wherein the detecting of the first set of objects in the first image data and/or the detecting of the second set of objects in the second image data is performed using a Triple Window Filter-based object detection algorithm.

15. An apparatus according to claim 12, wherein the calculating of the common coordinate system includes generating a homography matrix.

16. An apparatus according to claim 12, including allowing a user to select an object detection technique from a set of object detection techniques for detecting the first set and/or the second set of objects.

17. An apparatus according to claim 12, including allowing a user to select from a set of registration techniques to determine the calculation of the common coordinate system.

18. A non-transitory computer readable memory causing a computer to execute a procedure for detecting potential changed objects in a first image and a second image, where the first and second images at least partially overlap, the procedure comprising:
obtaining data describing a first image and data describing a second image;
detecting a first set of objects in the first image data;
detecting a second set of objects in the second image data;
calculating a common coordinate system for the first set of objects and the second set of objects;
converting locations of the objects in the first set and/or the second set into the common coordinate system;
targeting of said objects in the first set and the second set based on positions of the objects in the sets;
targeting of said objects in the first set and the second set that are located outside an area of overlap of the first image and the second image; and
outputting data indicating zero or more of said objects in the first set and the second set as potential changed objects,
wherein the step of eliminating zero or more said objects in the first set and the second set based on positions of the objects in the sets includes:
calculating a distance from at least one object in the first set and a nearest neighbour of that object in the second set;

calculating a distance from at least one object in the second set and a nearest neighbour of that object in the first set;

eliminating a said object in the first set if the distance between that object and the nearest neighbour of the object meets one or more culling criteria; and eliminating a said object in the second set if the distance between that object and the nearest neighbour of the object meets the culling criteria.

19. A non-transitory computer readable memory according to claim 18, wherein the data output includes all the objects not eliminated from the first set and all the objects not eliminated from the second set.

20. A non-transitory computer readable memory according to claim 18, wherein the detecting of the first set of objects in the first image data and/or the detecting of the second set of objects in the second image data is performed using a Triple Window Filter-based object detection algorithm.

* * * * *